United States Patent
Shin et al.

(10) Patent No.: US 9,954,940 B2
(45) Date of Patent: Apr. 24, 2018

(54) METHOD FOR PROVIDING CONTENT DELIVERY NETWORK SERVICE AND ELECTRONIC DEVICE THEREOF

(71) Applicant: Samsung Electronics Co., Ltd., Suwon-si, Gyeonggi-do (KR)

(72) Inventors: Kyoung-Heun Shin, Seongnam-si (KR); Jae-Hyon Roh, Hwaseong-si (KR); Tae-Hun Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 253 days.

(21) Appl. No.: 14/952,261

(22) Filed: Nov. 25, 2015

(65) Prior Publication Data

US 2016/0150050 A1    May 26, 2016

(30) Foreign Application Priority Data

Nov. 25, 2014  (KR) .................. 10-2014-0165468

(51) Int. Cl.
*G06F 15/173* (2006.01)
*H04L 29/08* (2006.01)

(52) U.S. Cl.
CPC ........ *H04L 67/101* (2013.01); *H04L 67/1097* (2013.01)

(58) Field of Classification Search
CPC .... H04L 67/16; H04L 67/101; H04L 67/1097
USPC ........................................ 709/226
See application file for complete search history.

(56) References Cited

U.S. PATENT DOCUMENTS

| | | | |
|---|---|---|---|
| 7,751,409 B1 * | 7/2010 | Carolan ............. | H04L 41/5045 370/352 |
| 8,914,814 B1 * | 12/2014 | Middleton ............. | G06F 9/541 718/104 |
| 9,210,154 B2 * | 12/2015 | Okamoto ............... | H04L 63/08 |
| 9,300,445 B2 * | 3/2016 | Hardin ................. | H04L 5/0007 |
| 9,565,074 B2 * | 2/2017 | Lehane ............... | H04L 41/5054 |
| 2014/0223017 A1 | 8/2014 | Lipstone et al. | |
| 2014/0223018 A1 | 8/2014 | Varney et al. | |

* cited by examiner

*Primary Examiner* — Kristie Shingles
(74) *Attorney, Agent, or Firm* — Jefferson IP Law, LLP

(57) ABSTRACT

A device for improving the use efficiency of a content delivery network (CDN) service and an operating method of a service distribution device are provided. The operating method includes receiving a service request signal from one or more electronic devices, determining an available domain for the service request signal based on the amount of idle traffic of one or more service domains in response to the reception of the service request signal, and transmitting a service response signal that includes the available domain information to the one or more electronic devices.

18 Claims, 12 Drawing Sheets

METHOD FOR PROVIDING CONTENT DELIVERY NETWORK SERVICE AND ELECTRONIC DEVICE THEREOF

CROSS-REFERENCE TO RELATED APPLICATION(S)

This application claims the benefit under 35 U.S.C. § 119(a) of a Korean patent application filed on Nov. 25, 2014 in the Korean Intellectual Property Office and assigned Serial number 10-2014-0165468, the entire disclosure of which is hereby incorporated by reference.

TECHNICAL FIELD

The present disclosure relates to a device and a method for providing content delivery network (CDN) services.

BACKGROUND

Content delivery network (CDN) services may refer to services that, in order to efficiently deliver the content such as websites, videos, or firmware files to a plurality of users in the Internet-based environment, deliver the corresponding content to the user who requires the content by using one or more servers (e.g., edge servers) that are distributed. For example, in the case of providing the CDN service, an origin server (or, content provider (CP) server) may pre-cache the content in one or more edge servers (or, cache servers) that are distributed at key points in the Internet, and may efficiently transmit the content to a plurality of users.

Content delivery network (CDN) service providers may charge a fee for using the CDN service according to a data throughput-based charging method or a traffic-based charging method. For example, according to the data throughput-based charging method, the fee is charged based on the amount of data that is downloaded by the user through the CDN service. According to the traffic-based charging method, the fee is charged based on a traffic value of a given time (e.g., the time when the amount of traffic reaches 95%) by using traffic values (the amount of traffic) that are collected in a reference time unit (e.g., 5 minutes).

In the case of the traffic-based charging method, since the charges are made based on the traffic value at a given time, the amount of traffic used daily may not reach the billing reference value, so there may be unused traffic.

In addition, in the case of providing a new CDN service, the provision of the new service may be delayed because a content provider is required to attend to a variety of procedures, such as a contract with a CDN service provider, the addition of a new domain, the addition of a new account, the establishment of an origin server, or cost negotiations.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure address at least the above-mentioned problems and/or disadvantages and provide at least the advantages described below. Accordingly, an aspect of the present disclosure is to provide a device and a method for reducing a traffic loss rate when providing the CDN service.

Another aspect of the present disclosure is to provide a device and a method for easily providing a new service by using an existing service domain that uses the CDN service.

In accordance with an aspect of the present disclosure, a service distribution device is provided. The service distribution device includes a communication interface that transmits/receives signals to/from one or more external devices, and a processor that makes a determination, in response to the reception of a service request signal from one or more electronic devices through the communication interface, of an available domain for the service request signal based on the amount of idle traffic of one or more service domains, and transmit a service response signal that includes the available domain information to the one or more electronic devices.

In accordance with another aspect of the present disclosure, an electronic device is provided. The electronic device includes a communication interface that transmits/receives signals to/from one or more external devices, and a processor that controls transmission of a service request signal to the first service domain through the communication interface, receives domain change information in response to the service request signal, and re-transmits the service request signal to the second service domain based on the domain change information.

In accordance with another aspect of the present disclosure, an operating method of a service distribution device is provided. The operating method includes receiving a service request signal from one or more electronic devices, determining an available domain for the service request signal based on the amount of idle traffic of one or more service domains in response to the reception of the service request signal, and transmitting a service response signal that includes the available domain information to the one or more electronic devices.

In accordance with another aspect of the present disclosure, an operating method of an electronic device is provided. The operating method includes transmitting a service request signal to the first service domain, receiving domain change information in response to the service request signal, and re-transmitting the service request signal to the second service domain based on the domain change information.

Other aspects, advantages, and salient features of the disclosure will become apparent to those skilled in the art from the following detailed description, which, when taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
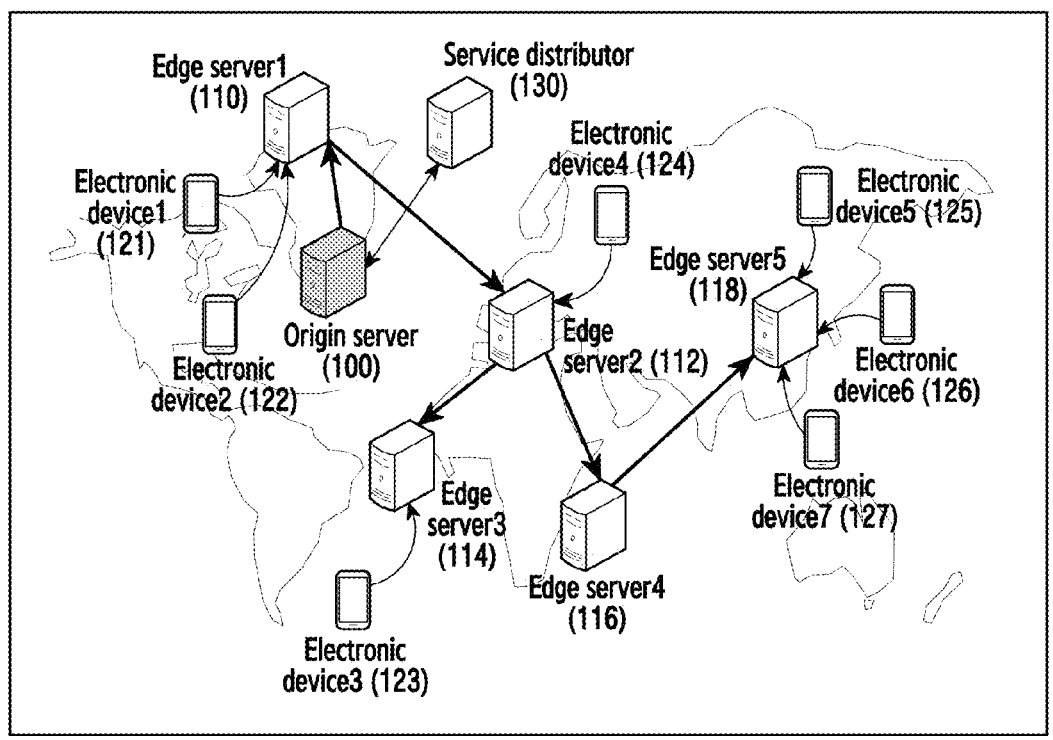
FIG. 1 illustrates a configuration of a content delivery network (CDN) service according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions are omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the," include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The terms "have", "may have", "include", or "may include" used in the various embodiments of the present disclosure indicate the presence of disclosed corresponding functions, operations, elements, and the like, and do not limit additional one or more functions, operations, elements, and the like. In addition, it should be understood that the terms "include" or "have" used in the various embodiments of the present disclosure are to indicate the presence of features, numbers, operations, elements, parts, or a combination thereof described in the specifications, and do not preclude the presence or addition of one or more other features, numbers, operations, elements, parts, or a combination thereof.

The terms "A or B", "at least one of A or/and B" or "one or more of A or/and B" used in the various embodiments of the present disclosure include any and all combinations of words enumerated with it. For example, "A or B", "at least one of A and B" or "at least one of A or B" describes (1) including at least one A, (2) including at least one B, or (3) including both at least one A and at least one B.

Although the term, such as "first" and "second" used in various embodiments of the present disclosure may modify various elements of various embodiments of the present disclosure, these terms do not limit the corresponding elements. For example, these terms do not limit an order and/or importance of the corresponding elements. These terms may be used for the purpose of distinguishing one element from another element. For example, a first user device and a second user device all indicate user devices and may indicate different user devices. For example, a first element may be named a second element without departing from the scope of right of various embodiments of the present disclosure, and similarly, a second element may be named a first element.

It will be understood that when an element (e.g., a first element) is "connected to" or "(operatively or communicatively) coupled with/to" to another element (e.g., a second element), the element may be directly connected or coupled to another element, and there may be an intervening element (e.g., a third element) between the element and another element. To the contrary, it will be understood that when an element (e.g., the first element) is "directly connected" or "directly coupled" to another element (e.g., the second element), there is no intervening element (e.g., the third element) between the element and another element.

The expression "configured to (or set to)" used in various embodiments of the present disclosure may be replaced with "suitable for", "having the capacity to", "designed to", "adapted to", "made to", or "capable of" according to a situation. The term "configured to (set to)" does not necessarily indicate "specifically designed to" in a hardware level. Instead, the expression "apparatus configured to . . . " may indicate that the apparatus is "capable of . . . " along with other devices or parts in a certain situation. For example, "a processor configured to (set to) perform A, B, and C" may be a dedicated processor, e.g., an embedded processor, for performing a corresponding operation, or a generic-purpose processor, e.g., a central processing unit (CPU) or an application processor (AP), capable of performing a corresponding operation by executing one or more software programs stored in a memory device.

The terms as used herein are used merely to describe certain embodiments and are not intended to limit the present disclosure. Further, all the terms used herein, including technical and scientific terms, should be interpreted to have the same description as commonly understood by those skilled in the art to which the present disclosure pertains, and should not be interpreted to have ideal or excessively formal description unless explicitly defined in various embodiments of the present disclosure.

An electronic device according to various embodiments of the present disclosure may be a device. For example, the electronic device according to various embodiments of the present disclosure may include at least one of a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), a Moving Picture Experts Group phase 1 or phase 2 (MPEG-1 or MPEG-2) audio layer 3 (MP3) player, a mobile medical device, a camera, or a wearable device (e.g., a head-mounted-device (HMD), electronic glasses, electronic clothing, an electronic bracelet, an electronic necklace, an electronic appcessory, an electronic tattoo, a smart mirror, a smart watch, and the like).

In various embodiments of the present disclosure, an electronic device may be a smart home appliance. For example, such appliances may include at least one of a television (TV), a digital versatile disc (DVD) player, an audio component, a refrigerator, an air conditioner, a vacuum cleaner, an oven, a microwave oven, a washing machine, an air cleaner, a set-top box, a home automation control panel, a security control panel, a TV box (e.g., Samsung HomeSync®, Apple TV®, or Google TV), a game console (e.g., Xbox® PlayStation®), an electronic dictionary, an electronic key, a camcorder, an electronic frame, and the like.

In various embodiments of the present disclosure, an electronic device may include at least one medical equipment element (e.g., a mobile medical device (e.g., a blood glucose monitoring device, a heart rate monitor, a blood pressure monitoring device, a temperature meter, and the like), a magnetic resonance angiography (MRA) machine, a magnetic resonance imaging (MRI) machine, a computed tomography (CT) scanner, an ultrasound machine, and the like), a navigation device, a global positioning system (GPS) receiver, an event data recorder (EDR), a flight data recorder (FDR), an in-vehicle infotainment device, an electronic equipment for a ship (e.g., a ship navigation equipment and/or a gyrocompass), avionics equipment, security equipment, a head unit for vehicles, an industrial or home robot, an automatic teller machine (ATM) of a financial institution, a point of sale (POS) device at a retail store, or an internet of things device (e.g., a lightbulb, various sensors, an electronic meter, a gas meter, a sprinkler, a fire alarm, a thermostat, a streetlamp, a toaster, sporting equipment, a hot-water tank, a heater, a boiler, and the like)

In various embodiments of the present disclosure, an electronic device may include at least one of a piece of furniture or a building/structure, an electronic board, an electronic signature receiving device, a projector, and various measuring instruments (e.g., a water meter, an electricity meter, a gas meter, a wave meter, and the like).

An electronic device according to various embodiments of the present disclosure may also include a combination of one or more of the above-mentioned devices.

Further, it will be apparent to those skilled in the art that an electronic device according to various embodiments of the present disclosure is not limited to the above-mentioned devices.

Herein, the term "user" may indicate a person who uses an electronic device or a device (e.g., an artificial intelligence electronic device) that uses the electronic device.

Hereinafter, the present disclosure may describe technology to improve the use efficiency of the CDN service.

FIG. 1 illustrates a configuration of the content delivery network (CDN) service according to various embodiments of the present disclosure. The following description will be made of the configuration of the CDN service with reference to a signal flow shown in FIG. 2.

Referring to FIG. 1, the CDN may include one or more origin servers 100 (or content provider (CP) server), a plurality of edge servers 110, 112, 114, 116, and 118 (or cache servers), and a service distributor 130.

The origin server 100 may pre-cache the content (e.g., web sites, videos, or firmware files) in the edge servers 110, 112, 114, 116, and 118 that are distributed at key points of the Internet.

Each of the electronic devices 121, 122, 123, 124, 125, 126, and 127 may receive the content through the origin server 100 or one or more edge servers 110, 112, 114, 116, and 118.

Figure 2:
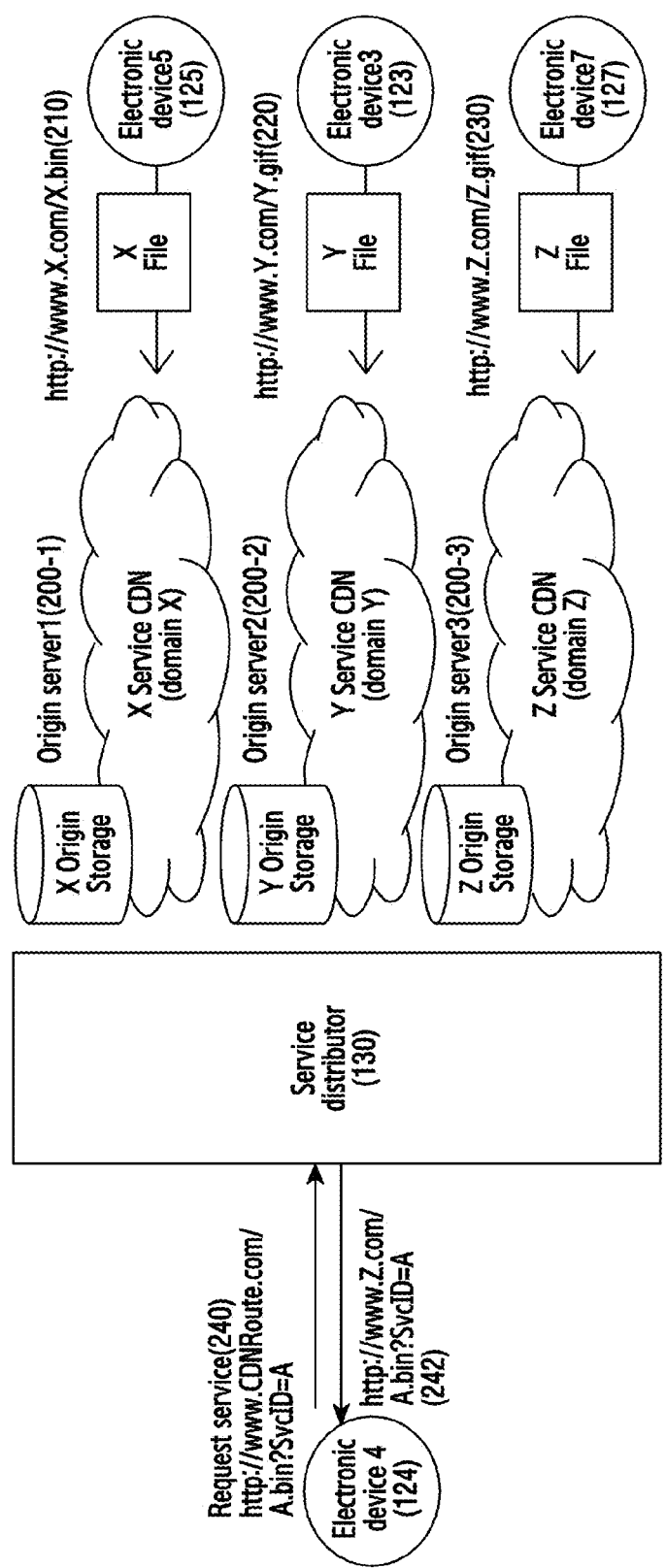
FIG. 2 illustrates a signal flow for a CDN service according to various embodiments of the present disclosure.

According to an embodiment of the present disclosure, in the case of FIG. 2, the electronic device 5 (125) may transmit a service request signal to the domain X (e.g., http://www.x.com/x.bin) (210). The origin server 200-1 for the service X, in response to the service request signal, may transmit, to the electronic device 5 (125), the content (e.g., firmware files) corresponding to the service request signal through the edge server 5 (118) that is located in (e.g., is adjacent to) the optimum path from the electronic device 5 (125) among the plurality of edge servers 110, 112, 114, 116, and 118.

FIG. 2 illustrates a signal flow for a CDN service according to various embodiments of the present disclosure.

Referring to FIG. 2, the electronic device 3 (123) may transmit a service request signal to the domain Y (e.g., http://www.y.com/y.gif) (220). The origin server 200-2 for the service Y, in response to the service request signal, may transmit, to the electronic device 3 (123), the content (e.g., videos) corresponding to the service request signal through the edge server 3 (114) that is located in (e.g., is adjacent to) the optimum path from the electronic device 3 (123) among the plurality of edge servers 110, 112, 114, 116, and 118.

According to an embodiment of the present disclosure, again in the case of FIG. 2, the electronic device 7 (127) may transmit a service request signal to the domain Z (e.g., http://www.z.com/z.jpg) (230). The origin server 200-3 for the service Z, in response to the service request signal, may transmit, to the electronic device 7 (127), the content (e.g., photos) corresponding to the service request signal through the edge server 5 (118) that is located in (e.g., is adjacent to) the optimum path from the electronic device 7 (127) among the plurality of edge servers 110, 112, 114, 116, and 118. In the example, the edge servers 110, 112, 114, 116, and 118 of the origin servers 200-1, 200-2, and 200-3 may be the same, or different from each other, or may overlap each other.

The service distributor 130 may make a determination to provide other services by using the idle traffic of one or more CDN service domains. For example, the idle traffic of the CDN service domain may refer to at least some traffic that is wasted without being used for providing services in the CDN service domain.

According to an embodiment of the present disclosure, in the case of FIG. 2, the service distributor 130 may monitor the idle traffic of one or more CDN service domains (the service domain X, the service domain Y, and the service domain Z). When the service distributor 130 receives a service request signal (240) for the domain A (the domain of the service distributor 130) (e.g., http://www.CDNRoute.com/A.bin?SvcID=A) from the electronic device 4 (124), the service distributor 130 may determine an available domain for the service A, based on the idle traffic for one or more CDN service domains. For example, if the service distributor 130 determines the domain Z to be the available domain for the service A, the service distributor 130 may transmit domain change information (242) for the service A (e.g., http://www.Z.com/A.bin? SvcID=A) to the electronic device 4 (124)). The electronic device 4 (124) may transmit a service request signal for the service A to the domain Z, based on the domain change information on the service A.

The origin server 200-3 for the service Z or the service distributor 130, in response to the service request signal, may transmit, to the electronic device 4 (124), the content (e.g., firmware files) corresponding to the service request signal through the edge server 2 (112) that is located in (e.g., is adjacent to) the optimum path from the electronic device 4 (124) among the plurality of edge servers 110, 112, 114, 116, and 118.

According to an embodiment of the present disclosure, if there is no CDN service domain that is to be configured as the available domain for the service A among the one or more CDN service domains, the service distributor 130 may transmit the content (e.g., firmware files) corresponding to the service request signal to the electronic device 4 (124) through its own domain that is allocated to the service distributor 130.

Figure 3A:
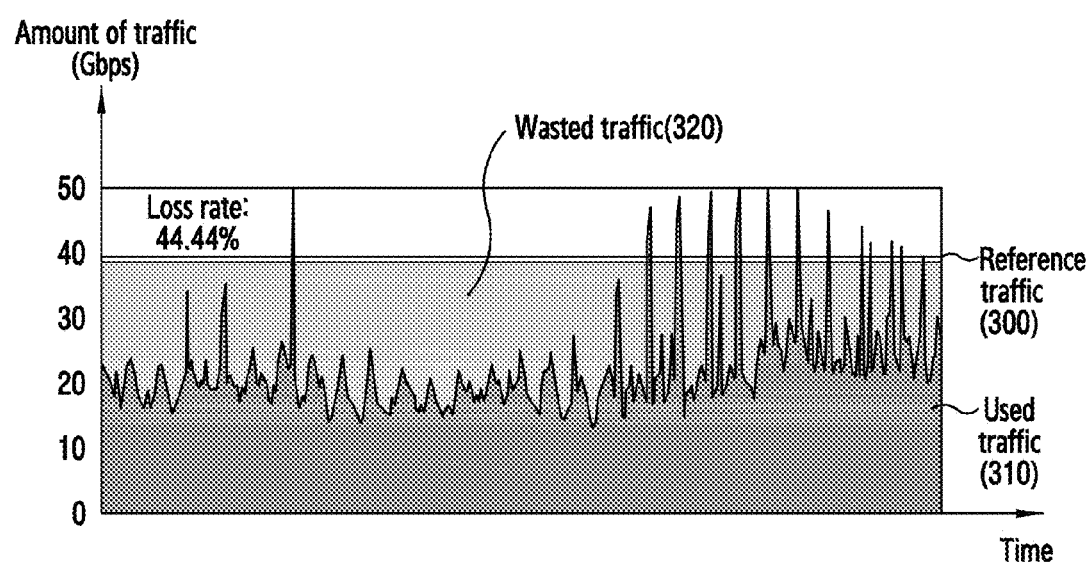
FIGS. 3A and 3B are efficiency graphs for a CDN service according to various embodiments of the present disclosure.
Figure 3B:
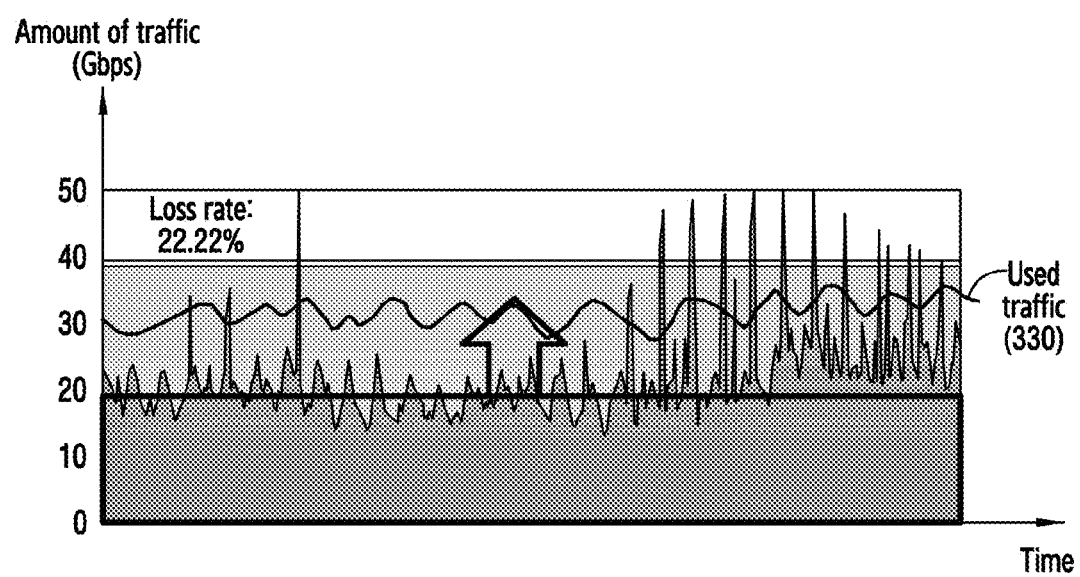

As described above, when the service distributor 130 configures the domain Z to be the available domain of the service A, the domain Z may additionally provide the service A through the idle traffic of the domain Z so that the CDN use efficiency may be increased as shown in FIGS. 3A and 3B.

FIGS. 3A and 3B are efficiency graphs for a CDN service according to various embodiments of the present disclosure.

Referring to FIG. 3A, a domain Z may use the amount of reference traffic 300 in order to provide a service based on billing information for the domain Z. However, when providing the service Z through the domain Z, the amount of traffic 310 that is actually used to provide the service Z may be less than the amount of reference traffic 300, so the wasted traffic capacity 320 may occur. For example, in the case of providing the service Z through the domain Z, the domain Z may result in a traffic loss rate of 44.44%. In the efficiency graphs of FIGS. 3A, 3B and 5, the amount of traffic is shown on the vertical axis in units of gigabits per second (Gbps) and time is shown on the horizontal axis in hours, minutes or seconds.

Referring to FIG. 3B, when the service A is provided by using the idle traffic of domain Z, the domain Z may use the amount of traffic 310 to provide the service Z, and may additionally use the amount of traffic 330 to provide the service A, thereby reducing the traffic loss rate. For example, in the case of providing the services Z and A through the domain Z, the domain Z may reduce the traffic loss rate to 22.22%.

Figure 4:
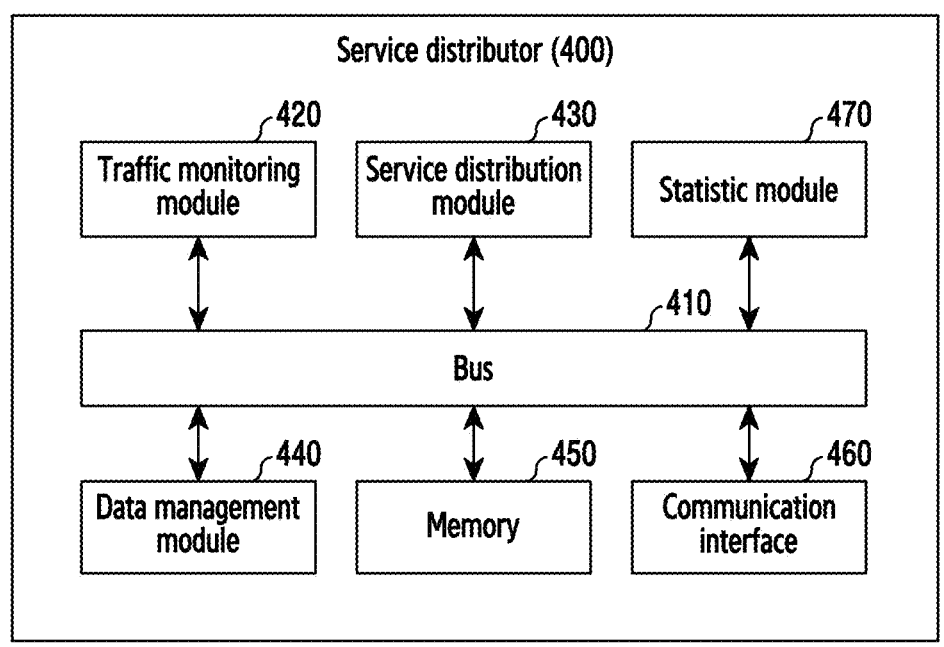
FIG. 4 is a block diagram of a service distributor according to various embodiments of the present disclosure.

FIG. 4 illustrates a block diagram of the service distributor according to various embodiments of the present disclosure.

Referring to FIG. 4, the service distributor 400 (e.g., the service distributor 130 of FIG. 1) may include a bus 410, a traffic monitoring module 420, a service distribution module 430, a data management module 440, a memory 450, a communication interface 460, and the statistic module 470 but embodiments are not limited thereto. For example, the service distributor 400 may exclude one or more elements described above, or may further include other elements.

The bus 410 may be a circuit that connects the above-mentioned elements (e.g., the traffic monitoring module 420, the service distribution module 430, the data management module 440, the memory 450, the communication interface 460, and/or the statistic module 470) with each other, and transmits communication (e.g., control messages) between the elements set forth above.

The traffic monitoring module 420 may monitor the amount of traffic of one or more CDN service domains that provide the CDN service. For example, the traffic monitoring module 420 may monitor the amount of traffic of each CDN service domain in a reference time unit (e.g., 5 minutes). For example, the traffic monitoring module 420 may identify the amount of traffic of the CDN service domain through an application program interface (API) of the CDN server that operates the corresponding CDN service domain. The CDN server may also refer to a server that is operated to provide the CDN service by the CDN service provider.

Figure 5:
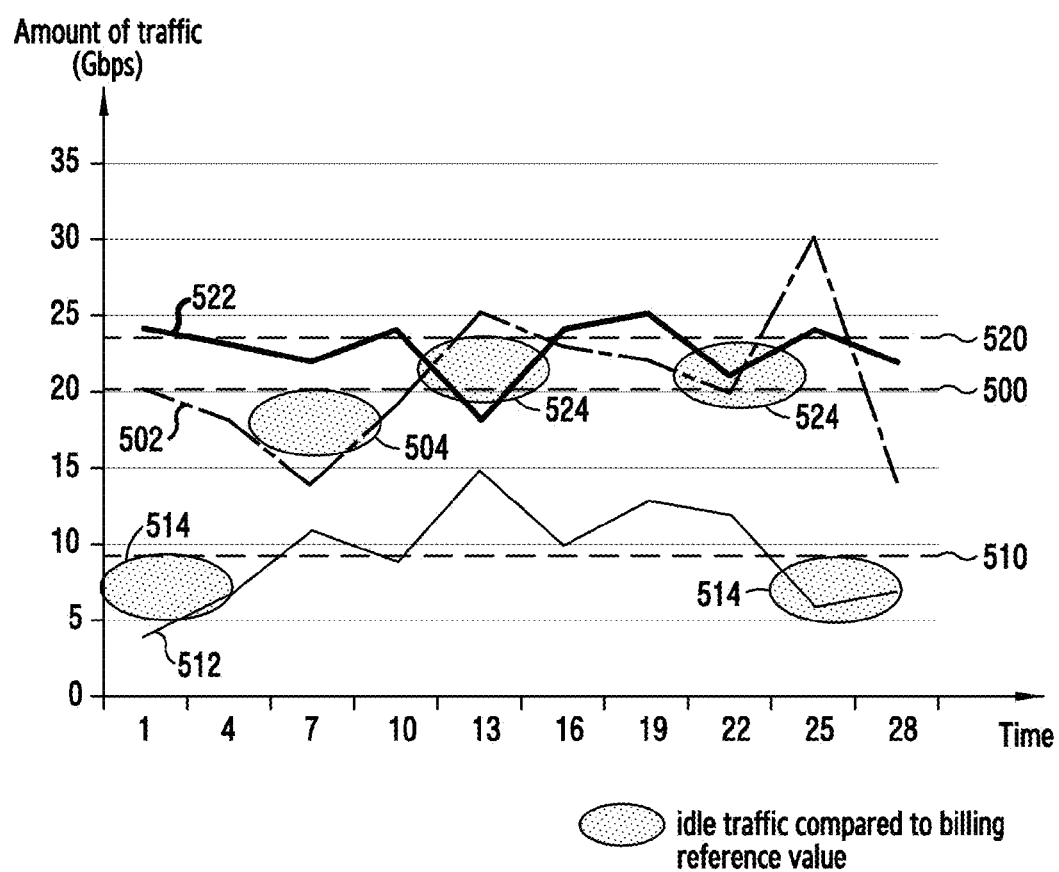
FIG. 5 is a graph of idle traffic according to various embodiments of the present disclosure.

FIG. 5 is a graph of idle traffic according to various embodiments of the present disclosure.

Referring to FIG. 5, the traffic monitoring module 420 may identify the amount of idle traffic of each CDN service domain by using the amount of traffic of one or more CDN service domains. For example, in FIG. 5, the traffic monitoring module 420 may compare the amount of reference traffic 500 corresponding to the billing information of the domain X with the amount of traffic 502 of the monitored domain X in order to thereby identify the idle traffic 504 of the domain X. The traffic monitoring module 420 may further compare the amount of reference traffic 510 corresponding to the billing information of the domain Y with the amount of traffic 512 of the monitored domain Y in order to thereby identify the idle traffic 514 of the domain Y. The traffic monitoring module 420 may still further compare the amount of reference traffic 520 corresponding to the billing information of the domain Z with the amount of traffic 522 of the monitored domain Z in order to thereby identify the idle traffic 524 of the domain Z. The traffic monitoring module 420 may identify the amount of idle traffic of each CDN service domain in every reference time unit in which the amount of traffic of the CDN service domain is monitored.

Returning to FIG. 4, the service distribution module 430 may make a determination to provide other services by using the idle traffic of one or more CDN service domains.

According to an embodiment of the present disclosure, when the service distribution module 430 receives a service request signal for the domain A (e.g., the domain of the service distributor 400) from the electronic device, the service distribution module 430 may identify the service A by using a value parameter of service identifier ('svcID') that is included in the uniform resource locator (URL) of the service request signal. The service distribution module 430 may estimate the amount of traffic according to the provision of the service A through each CDN service domain. The service distribution module 430 may determine an available domain for the service A, based on at least one of the amount of idle traffic of each CDN service domain or the estimated amount of traffic due to the provision of the service A. The service distribution module 430 may transmit the domain change information (e.g., the URL address corresponding to the change in the domain) for the service A to the electronic device.

The data management module 440 may make a determination to store the content of other services in the memory 450 in order to provide other services by using the idle traffic of one or more CDN service domains.

According to an embodiment of the present disclosure, when the CDN server requests the content, the data management module 440 may identify whether or not the corresponding content is stored in the memory 450. If the content requested by the CDN server is stored in the memory 450, the data management module 440 may control the communication interface 460 to send the corresponding content to the CDN server.

According to an embodiment of the present disclosure, the data management module 440, according to the determination for providing other services through one or more CDN service domains, may make a further determination to prevent the traffic load from occurring in the origin servers of one or more CDN service domains. For example, the data management module 440 may provide a cache load prevention function to manage time to live (TTL) of the origin server for each CDN service domain.

According to an embodiment of the present disclosure, the data management module 440 may manage the content stored in the memory 450. For example, the data management module 440 may determine the deletion of the content, based on at least one of the usage time of the content stored in the memory 450 or the number of times which the content is used. For example, the data management module 440 may selectively delete the content of the corresponding service in consideration of a service policy for each service.

The memory 450 may include volatile and/or nonvolatile memories. The memory 450 may include instructions or data (e.g., the content) related to one or more other elements of the service distributor 400.

The communication interface 460 may connect communications between the service distributor 400 and external devices (e.g., the electronic device or the CDN server). The communication interface 460 may connect to the network through wireless communication or wired communication in order to thereby communicate with the external device. For example, the wireless communication may include short-range communication schemes or cellular communication protocols. The short-range communication schemes may include at least one of Wi-Fi, Bluetooth, near field communication (NFC), or a GPS but embodiments are not limited thereto. The cellular communication protocols may include at least one of long term evolution (LTE), LTE-Advanced (LTE-A), code division multiple access (CDMA), wideband-CDMA (WCDMA), a universal mobile telecommunication system (UMTS), wireless broadband (WiBro), or global system for mobile communication (GSM) but embodiments are not limited thereto. For example, the wired communication may include at least one of a universal serial bus (USB), a high definition multimedia interface (HDMI), recommended standard 232 (RS-232), or a plain old telephone service (POTS).

The statistic module 470 may provide the statistics on the amount of traffic of the services that are provided by one or more CDN service domains. For example, the statistic module 470 may collect access logs of the CDN server that operates each CDN service domain in order to thereby provide the statistics on the traffic amount of the services provided through one or more CDN service domains.

According to an embodiment of the present disclosure, the statistic module 470 may also provide the statistics on the traffic amount of other services that are provided by using the idle traffic of one or more CDN service domains.

According to an embodiment of the present disclosure, the statistic module 470 may also provide the statistics on the traffic amount of existing services that are provided through one or more CDN service domains. For example, the statistic module 470 may provide the statistics on the traffic amount of existing services by using the amount of traffic according to the provision of the service and the amount of traffic of other services in each CDN service domain.

According to an embodiment of the present disclosure, the statistic module 470 may also provide the statistics on the history record showing that the service distributor 400 has distributed services to one or more CDN service domains.

In the case of FIG. 4, the service distributor 400 may include a plurality of modules (e.g., the traffic monitoring module 420, the service distribution module 430, the data management module 440, or the statistic module 470) in order to provide other services by using the idle traffic of the CDN service domain.

According to various embodiments of the present disclosure, the service distributor 400 may include a single module (e.g., a processor) in order to provide other services by using the idle traffic of the CDN service domain.

Figure 6:
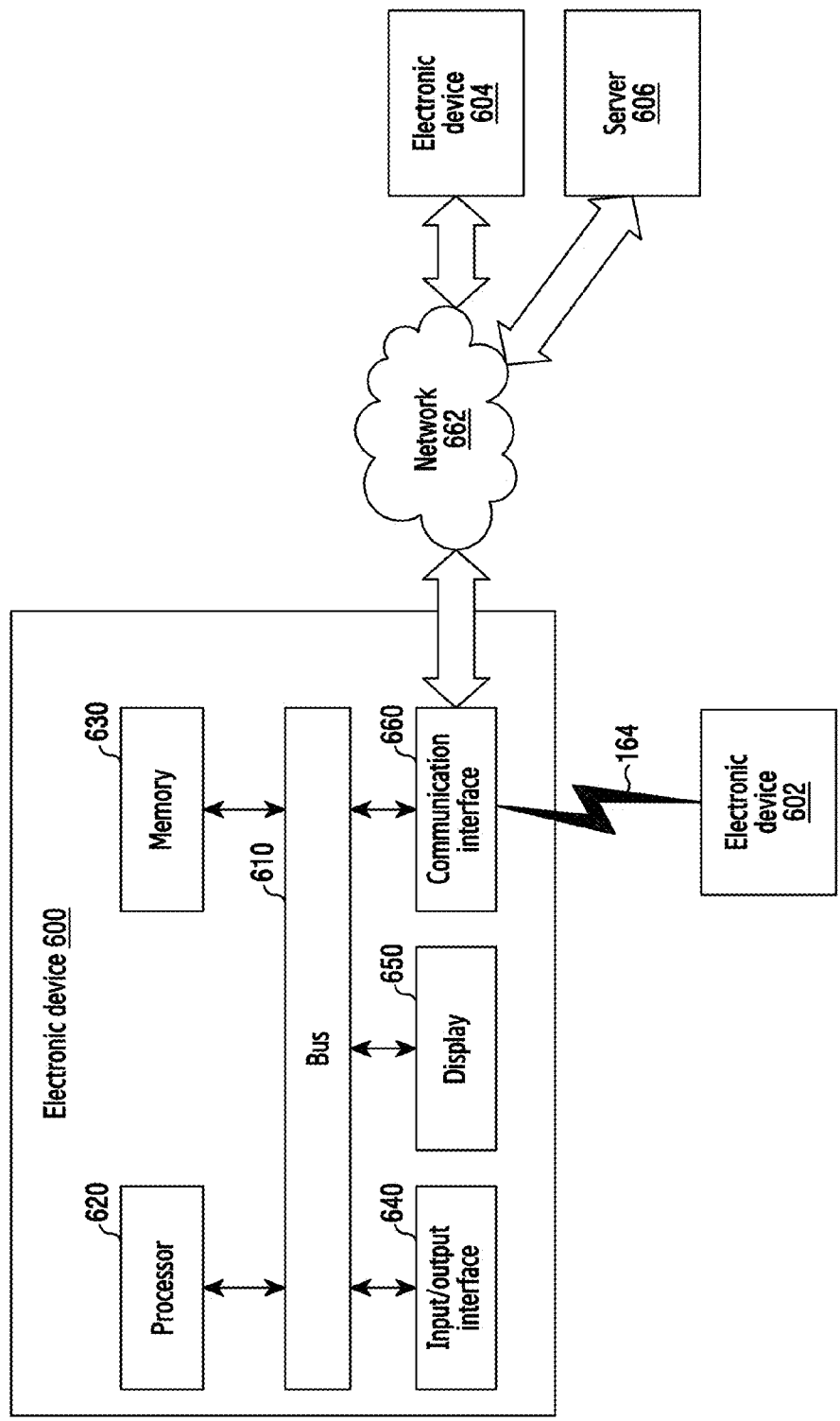
FIG. 6 is a block diagram of an electronic device according to various embodiments of the present disclosure.

FIG. 6 is a block diagram of an electronic device according to various embodiments of the present disclosure.

Referring to FIG. 6, an electronic device 600 (e.g., the electronic device 4 (124)) may include a bus 610, a processor 620, a memory 630, an input/output interface 640, a display 650, and a communication interface 660 but embodiments are not limited thereto. For example, the electronic device 600 may exclude one or more elements described above, or may further include other elements.

The bus 610 may be a circuit that connects the above-described elements (e.g., the processor 620, the memory 630, the input/output interface 640, the display 650, or the communication interface 660) with each other, and transmits communication (e.g., control message) between the elements above.

The processor 620 may include one or more of a CPU, an AP, or a communication processor (CP). The processor 620, for example, may perform the calculation or data processing for the control and/or communication of one or more elements of the electronic device 600.

According to an embodiment of the present disclosure, the processor 620 may make a determination to transmit a service request signal to the service domain. For example, the processor 620 may control the communication interface 660 to transmit a service request signal to the domain of the service distributor 400. When the processor 620 receives the domain change information from the service distributor 400, the processor 620 may control the communication interface 660 to re-transmit the service request signal to a domain that has been changed based on the domain change information.

The memory 630 may include volatile and/or nonvolatile memories. The memory 630 may store instructions or data related to one or more other elements of the electronic device 600. According to an embodiment of the present disclosure, the memory 630 may store software and/or programs. For example, the programs may include a kernel, middleware, an API, or application programs. At least some of the kernel, the middleware, or the API may be referred to as an operating system (OS).

The input/output interface 640 may function as an interface that forwards instructions or data input from the user or other external devices to the other elements of the electronic device 600. In addition, the input/output interface 640 may output instructions or data received from the other elements of the electronic device 600 to the user or other external devices.

The display 650, for example, may include a liquid crystal display (LCD), a light emitting diode (LED) display, an organic LED (OLED) display, a micro-electro-mechanical system (MEMS) display, or an electronic paper display but embodiments are not limited thereto. The display 650, for example, may display various types of content (e.g., text, images, videos, icons, or symbols) to the user. The display 650 may include a touch screen, and, for example, may receive inputs in the form of touches, gestures, proximity gestures, and hovering gestures.

The communication interface 660 may connect communication between the electronic device 600 and external devices (e.g., the electronic device 602 or 604, or the server 606). For example, the communication interface 660 may connect to the network 662 through wireless communication or wired communication in order to thereby communicate with the external devices 604 and 606, and/or may connect directly to the external device 602 through wireless communication or wired communication 164 in order to thereby communicate with the external device 602.

The network 662 may include one or more communications networks, such as, computer networks (e.g., local area network (LAN) or wide area network (WAN)), the Internet, or a telephone network.

Figure 7:
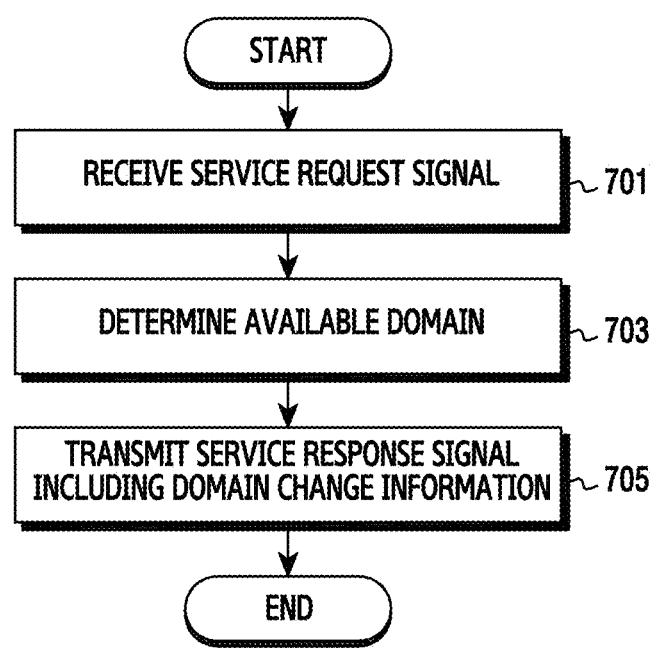
FIG. 7 is a flowchart of a method for using the idle traffic in a service distributor according to various embodiments of the present disclosure.

FIG. 7 is a flowchart of a method for using idle traffic in the service distributor according to various embodiments of the present disclosure.

Referring to FIG. 7, in operation 701, the service distributor (e.g., the service distributor 130 of FIG. 1, or the service distributor 400 of FIG. 4) may receive a service request signal from one or more electronic devices (e.g., the electronic device 4 (124) of FIG. 1, or the electronic device 600 of FIG. 6). For example, the service distributor may receive a service request signal of the domain A (e.g., the domain of the service distributor) from the electronic device.

In operation 703, the service distributor may determine an available domain of a service corresponding to the service request signal, based on the idle traffic of one or more CDN service domains that provide the CDN service. For example, the service distributor may calculate the amount of idle traffic of the corresponding CDN service domain by using a difference between the amount of target traffic of each CDN service domain and the amount of traffic to be charged. Here, the amount of target traffic may include the amount of use-target traffic (e.g., 90%) with respect to the amount of available traffic of the CDN service domain, which is configured as a flat-rate charge. The amount of traffic to be charged may include the amount of available traffic that corresponds to the billing information that is configured with the amount of traffic used for providing the service of last month.

In operation 705, the service distributor may transmit a service response signal including the domain change information to the electronic device. For example, the service distributor may change the URL address of the service request signal to correspond to the available domain information, and may transmit the same to the electronic device. The domain change information may include the available domain information about the service request signal but embodiments are not limited thereto.

Figure 8:
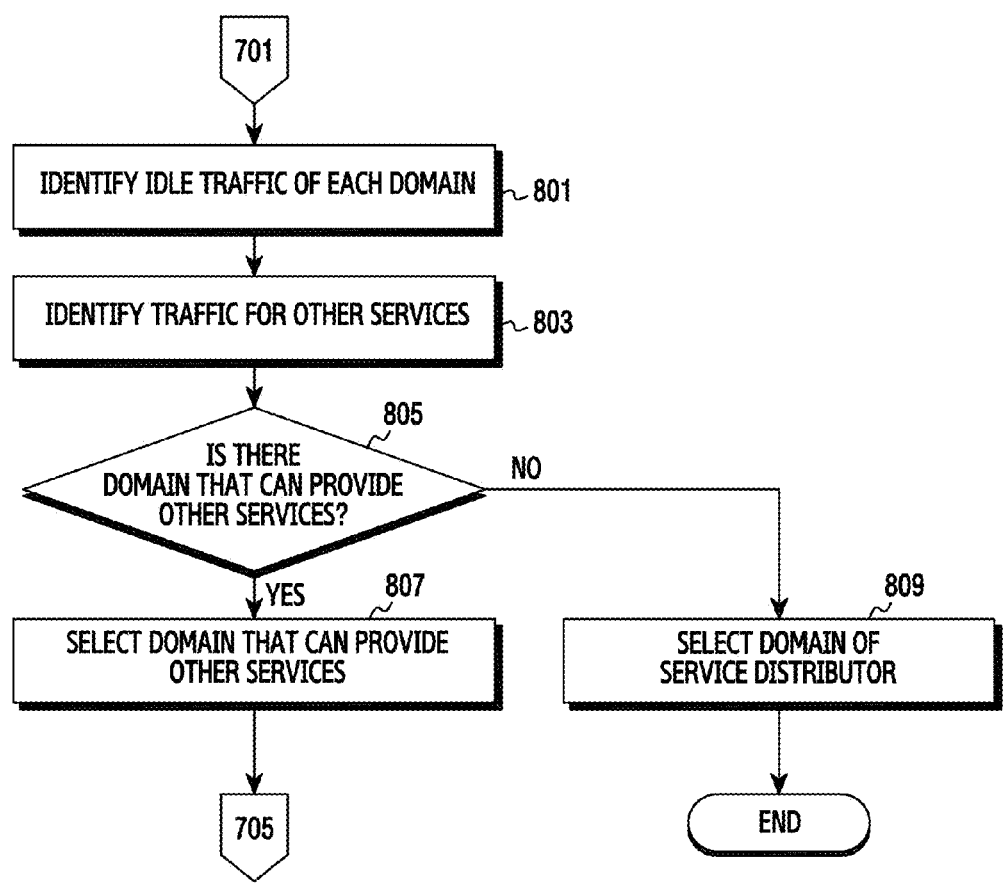
FIG. 8 is a flowchart of a method for selecting an available domain in a service distributor according to various embodiments of the present disclosure.

FIG. 8 is a flowchart of a method for selecting an available domain in a service distributor according to various embodiments of the present disclosure. The following description may explain the operation for determining the available domain in operation 703 of FIG. 7.

Referring to FIG. 8, in operation 801, when the service distributor (e.g., the service distributor 130 of FIG. 1, or the service distributor 400 of FIG. 4) receives the service request signal from one or more electronic devices in operation 701 of FIG. 7, the service distributor may identify the idle traffic of one or more CDN service domains that are providing the CDN services. When the service request signal is received, the service distributor may identify the total amount of idle traffic of each CDN service domain, which is checked in a reference time unit (e.g., 5 minutes). For example, when the service request signal is received, the service distributor may identify the amount of idle traffic of each CDN service domain by using the amount of traffic of each CDN service domain that is monitored in a reference time unit.

In operation 803, the service distributor may identify the amount of traffic for other services with respect to each CDN service domain. For example, the service distributor may estimate the amount of traffic that additionally occurs in accordance with the provision of other services through each CDN service domain.

In operation 805, the service distributor may identify whether or not there is a CDN service domain that can provide other services based on the amount of idle traffic of each CDN service domain and the amount of traffic for other services. For example, the service distributor may compare the amount of idle traffic of the CDN service domain with the amount of traffic for other services, and may identify whether or not there is a CDN service domain, of which the amount of idle traffic is equal to or greater than the amount of traffic for other services.

In operation 807, if there is a CDN service domain that provides other services, the service distributor may determine an available domain of the service corresponding to the service request signal based on the amount of idle traffic of the CDN service domain. For example, the service distributor may identify the amount of idle traffic of each CDN service domain as shown in Table 1 below.

TABLE 1

| Time | Idle Traffic of Domain X | Idle Traffic of Domain Y | Idle Traffic of Domain Z |
| --- | --- | --- | --- |
| ... | ... | ... | ... |
| 14:13:05 | 5 | 0 | 10 |
| 14:13:10 | 7 | 0 | 14 |
| 14:13:15 | 4 | 0 | 13 |
| 14:13:20 | 4 | 0 | 11 |
| ... | ... | ... | ... |

In the case of Table 1, the service distributor may compare the amount of idle traffic of the domain X and the domain Z, which have the idle traffic, with the amount of traffic for other services, and may identify whether or not there is a domain that can provide other services. For example, if other services are to be provided through the domain X and the domain Z, the service distributor may determine the domain Z to be the available domain for other services based on the amount of idle traffic.

In operation 809, if there is not a CDN service domain that can provide other services, the service distributor may determine its own domain to be the domain for providing other services.

When the service distributor determines its own domain to be the domain for providing other services, the service distributor may extract the content corresponding to the service request signal from the memory (e.g., the memory 650), and may the same to the electronic device.

In operation 705 of FIG. 7, the service distributor may then transmit a service response signal including the domain change information to the electronic device.

Figure 9:
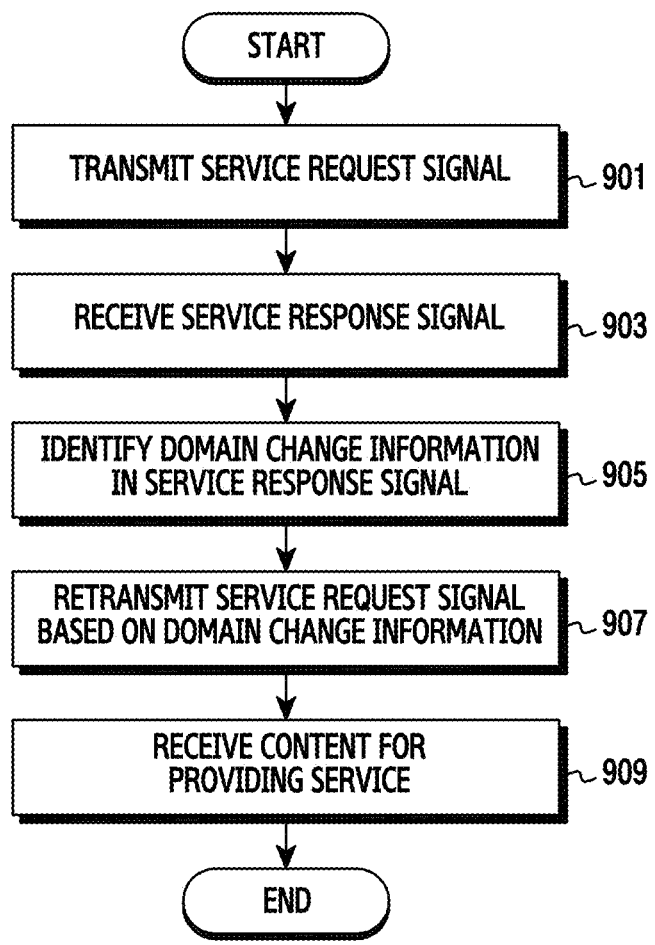
FIG. 9 is a flowchart of a method for requesting a service in an electronic device according to various embodiments of the present disclosure.

FIG. 9 is a flowchart of a method for requesting a service in an electronic device according to various embodiments of the present disclosure.

Referring to FIG. 9, in operation 901, the electronic device may transmit a service request signal for the service A to the domain of the service A (e.g., the domain of the service distributor).

In operation 903, the electronic device may receive a service response signal to the service request signal.

In operation 905, the electronic device may identify the domain change information from the service response signal. For example, the electronic device may identify the URL address that has been changed to correspond to the domain change in the service response signal.

In operation 907, the electronic device may re-transmit the service request signal based on the domain change information. For example, the electronic device may transmit the service request signal by using the URL address that has been changed to correspond to the domain change.

In operation 909, the electronic device may receive the content corresponding to the service request signal that has been re-transmitted. For example, the electronic device may receive the content through the origin server corresponding to the domain change information, the service distributor, or the edge server.

Figure 10:
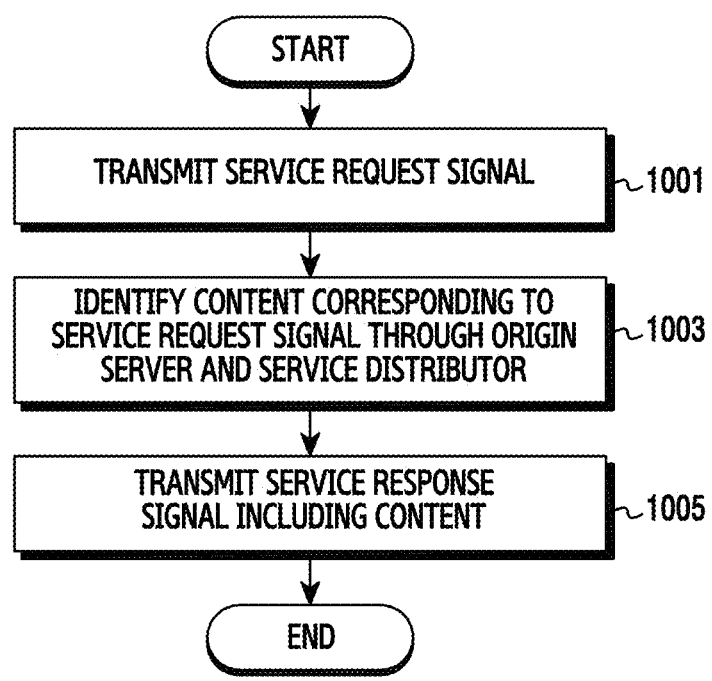
FIG. 10 is a flowchart of a method for providing content in a CDN server according to various embodiments of the present disclosure.

FIG. 10 is a flowchart of a method for providing content in a CDN server according to various embodiments of the present disclosure.

Referring to FIG. 10, in operation 1001, the CDN server may receive the service request signal for the CND service domain from one or more electronic devices.

In operation 1003, the CDN server may identify the content corresponding to the service request signal through the origin server for the CDN service domain or the service distributor. In the case where the CDN server cannot identify the content corresponding to the service request signal from the origin server for the CDN service domain, the CDN server may make a request to the service distributor for the content corresponding to the service request signal in order to thereby identify the content. For example, the CDN server may simultaneously make a request to the origin server for the CDN service domain and the service distributor for the content corresponding to the service request signal to then identify the content.

In operation 1005, the CDN server may transmit a service response signal including the content corresponding to the service request signal to one or more electronic devices.

As described above, the service distributor may store the content for other services in the memory in order to provide the other services without using a separate origin server. In this case, in order to enhance the memory efficiency, the service distributor may manage the content stored in the memory as follows. For example, the service distributor may selectively manage the content for the corresponding service to conform to each service policy.

Figure 11:
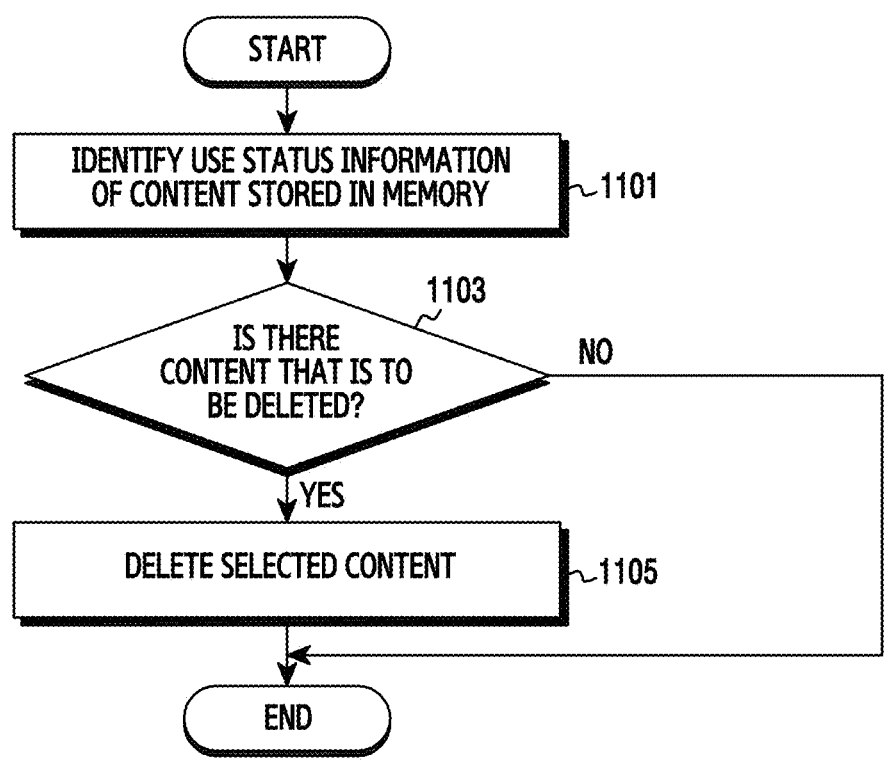
FIG. 11 is a flowchart of a method for managing content in the service distributor according to various embodiments of the present disclosure.

FIG. 11 is a flowchart of a method for managing content in a service distributor according to various embodiments of the present disclosure.

Referring to FIG. 11, in operation 1101, the service distributor (e.g., the service distributor 130 of FIG. 1, or the service distributor 400 of FIG. 4) may identify the use status information of the content stored in the memory (e.g., the memory 450). For example, the use status information of the content may include at least one of the content use time, or the number of times of using content.

In operation 1103, the service distributor may identify whether or not there is content that is to be deleted based on the use status information of the content stored in the memory. For example, the service distributor may identify whether or not there are one or more pieces of content that has not been used (or selected) within a reference time on the basis of the present time by using the content use time. The service distributor may also identify whether or not there are one or more pieces of content of which the number of usage times is less than the reference number of times by using the number of times by which the content is used. The service distributor may also identify whether or not there are one or more pieces of content that has not been used (or selected) within a reference time on the basis of the present time among one or more pieces of content of which the number of usage times is less than the reference number of times, based on the content use time and the number of times by which the content is used.

In operation 1105, if there is content that is to be deleted, the service distributor may delete the corresponding content from the memory.

According to various embodiments of the present disclosure, a new service of a small amount of traffic is provided through an existing service domain that uses the CDN service during an idle period of time so that the traffic loss rate for the existing service domain may be reduced and a delay due to the providing of the new service may be reduced.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a read only memory (ROM), a random access memory (RAM), compact discROMs (CD-ROMs), magnetic tapes, floppy disks, and optical data storage devices but embodiments are not limited thereto. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

The various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices but embodiments are not limited thereto. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added. Further, various embodiments disclosed in this document are only for the description and understanding of technical contents and do not limit the scope of the present disclosure. Accordingly, the scope of the present disclosure should be construed as including all modifications or various other embodiments based on the technical idea of the present disclosure.

The module or program module according to various embodiments of the present disclosure may further include at least one or more constitutional elements among the aforementioned constitutional elements, or may omit some of them, or may further include additional constitutional elements. Operations performed by a module, programming module, or other constitutional elements according to various embodiments of the present disclosure may be executed in a sequential, parallel, repetitive, or heuristic manner. In addition, some of the operations may be executed in a different order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A device for distributing a service, the device comprising:
    a communication interface configured to transmit/receive signals to/from one or more external devices; and
    a processor configured to:
    receive a service request signal associated with a first service domain from electronic device through the communication interface,
    determine, based on an amount of idle traffic of each of a plurality of service domains, including the first service domain, a second service domain among the plurality of service domains, as an available domain for the service request signal, and
    transmit a service response signal including information of the second service domain to the electronic device through the communication interface,
    wherein the service response signal indicates that a service domain for the service is changed from the first service domain into the second service domain, and
    wherein the service response signal comprises a uniform resource locator (URL) corresponding to the second service domain.

2. The device of claim 1, wherein the service domain comprises a content delivery network (CDN) service domain that provides a CDN service.

3. The device of claim 1, wherein the processor is further configured to determine the amount of idle traffic of the service domain by using a difference between an amount of target traffic of the service domain and an amount of traffic to be charged.

4. The device of claim 1, wherein the processor is further configured to:
    monitor an amount of traffic of each of the plurality of service domains in a reference time unit, and
    identify the idle traffic of each service domain in every reference time based on the monitoring result.

5. The device of claim 1, wherein the processor is further configured to, in response to the reception of the service request signal from the electronic device, identify the idle traffic of each service domain by using a reference traffic corresponding to billing information, and an amount of traffic of each of the plurality of service domains, which is monitored in a reference time unit.

6. The device of claim 1, wherein the processor is further configured to:
    estimate an amount of traffic that additionally occurs according to a provision of a service in response to the service request signal in each service domain, and
    determine the available domain for the service request signal by using the estimated amount of traffic and the amount of idle traffic for each service domain.

7. The device of claim 6, wherein the processor is further configured to:
    select one or more service domains of which the amount of idle traffic is equal to or greater than the amount of traffic that additionally occurs according to the provision of the service in response to the service request signal from the one or more service domains, and
    determine one of the selected one or more service domains as the available domain for the service request signal.

8. The device of claim 1, further comprising:
    a memory configured to store content, and
    wherein the processor is further configured to determine whether content is to be deleted based on a use time of the content stored in the memory, and a number of times by which the content is used.

9. An electronic device comprising:
    a communication interface configured to transmit/receive signals to/from one or more external devices; and
    a processor configured to:
    transmit a service request signal to a first service domain through the communication interface,
    receive a service response signal indicating that a service domain for the service is changed from the first service domain into the second service through the communication interface in response to the service request signal, and
    re-transmit the service request signal to the second service domain based on the received service response signal through the communication interface,
    wherein the service response signal indicates that a service domain for the service is changed from the first service domain into the second service domain, and
    wherein the service response signal comprises a uniform resource locator (URL) corresponding to the second service domain.

10. A method of operating a service distribution device, the method comprising:
    receiving a service request signal associated with a first service domain from an electronic device;
    determining, based on an amount of idle traffic of each of a plurality of domains including the first service domain, a second service domain among the plurality of domain, as an available domain for the service request signal, in response to the reception of the service request signal; and
    transmitting a service response signal including information of the second service domain to the electronic device,
    wherein the service response signal indicates that a service domain for the service is changed from the first service domain into the second service domain, and wherein the service response signal comprises a uniform resource locator (URL) corresponding to the second service domain.

11. The method of claim 10, wherein the service domain includes a content delivery network (CDN) service domain that provides a CDN service.

12. The method of claim 10, wherein the amount of idle traffic of the service domain is determined based on a difference between an amount of target traffic of the service domain and an amount of traffic to be charged.

13. The method of claim 10, further comprising:
monitoring an amount of traffic of each of the plurality of service domains in a reference time unit before receiving the service request signal; and
identifying the idle traffic of each service domain in every reference time based on the monitoring result.

14. The method of claim 10, further comprising, in response to the reception of the service request signal from the electronic device, identifying the idle traffic of each service domain by using a reference traffic corresponding to billing information, and an amount of traffic of each of the plurality of service domains, which is monitored in a reference time unit.

15. The method of claim 10, wherein the determining of the available domain comprises:
estimating an amount of traffic that additionally occurs according to a provision of a service in response to the service request signal in each service domain; and
determining the available domain for the service request by using the estimated amount of traffic and the amount of idle traffic for each service domain.

16. The method of claim 15, wherein the determining of the available domain comprises:
selecting one or more service domains of which the amount of idle traffic is equal to or greater than the amount of traffic that additionally occurs according to the provision of the service in response to the service request signal from the one or more service domains; and
determining one of the selected one or more service domains as the available domain for the service request signal.

17. A method of operating an electronic device, the method comprising:
transmitting a service request signal to a first service domain;
receiving a service response signal indicating that a service domain for the service is changed from the first service domain into the second service in response to the service request signal; and
re-transmitting the service request signal to the second service domain based on the received service response signal,
wherein the service response signal indicates that a service domain for the service is changed from the first service domain into the second service domain, and
wherein the service response signal comprises a uniform resource locator (URL) corresponding to the second service domain.

18. The method of claim 17,
wherein the first service domain includes a domain of a service distributor, and
wherein the second service domain includes a content delivery network (CDN) service domain that provides a CDN service.

* * * * *